(12) United States Patent
Lederman et al.

(10) Patent No.: US 11,157,433 B2
(45) Date of Patent: Oct. 26, 2021

(54) MULTI-CHIP MODULE RATE ADJUSTMENT

(71) Applicant: MELLANOX TECHNOLOGIES TLV LTD., Ra'anana (IL)

(72) Inventors: Guy Lederman, Rishon LeZion (IL); Ran Ravid, Tel Aviv (IL); Asaf Horev, Rishon LeZion (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 0 days.

(21) Appl. No.: 16/752,654

(22) Filed: Jan. 26, 2020

(65) Prior Publication Data

US 2021/0232525 A1  Jul. 29, 2021

(51) Int. Cl.
*G06F 13/40* (2006.01)

(52) U.S. Cl.
CPC ................ *G06F 13/4063* (2013.01)

(58) Field of Classification Search
CPC .............. G06F 13/4063; G06F 13/3625
See application file for complete search history.

(56) References Cited

U.S. PATENT DOCUMENTS

| | | | |
|---|---|---|---|
| 5,361,097 A | 11/1994 | Kolczynski | |
| 5,606,562 A | 2/1997 | Landguth | |
| 6,029,202 A | 2/2000 | Frazier et al. | |
| 7,640,486 B2 | 12/2009 | Döttling et al. | |
| 8,555,133 B2 | 10/2013 | Cho et al. | |
| 2004/0123222 A1* | 6/2004 | Widmer | H04L 25/4908 714/779 |
| 2005/0105605 A1 | 5/2005 | Morsberger et al. | |
| 2012/0311371 A1* | 12/2012 | Shaeffer | G06F 13/1694 713/501 |
| 2015/0131681 A1* | 5/2015 | Balbierer | H04L 12/12 370/477 |
| 2017/0228171 A1* | 8/2017 | Huang | G06F 3/0652 |
| 2019/0158759 A1* | 5/2019 | Hatakeyama | H04N 5/232411 |
| 2020/0213471 A1* | 7/2020 | Minegishi | H04N 1/32459 |

FOREIGN PATENT DOCUMENTS

WO  2017215495 A1  12/2017

OTHER PUBLICATIONS

Jadid., "Parallel Ultra-Short Reach Die-to-Die Links", PhD Thesis, Graduate Department of Electrical and Computer Engineering, University of Toronto, pp. 1-141, 2017.

* cited by examiner

*Primary Examiner* — Faisal M Zaman
*Assistant Examiner* — Phong H Dang
(74) *Attorney, Agent, or Firm* — Kligler & Associates Patent Attorneys Ltd (57) ABSTRACT

A Multi-Chip-Module (MCM) includes an MCM substrate and at least a data producing IC (DPIC) and a data-consuming IC (DCIC), both mounted on the MCM substrate and connected to one another through a high-speed bus having a fixed data rate. The DPIC is configured to send data to the DCIC by alternating between (i) first time periods during which the DPIC sends over the bus both produced data and dummy data that together have the fixed data rate of the bus, and (ii) second time periods during which the DPIC sends over the bus only dummy data at the fixed data rate, wherein a rate of the produced date and durations of the first time periods and the second time periods, are preset.

12 Claims, 5 Drawing Sheets

MULTI-CHIP MODULE RATE ADJUSTMENT

FIELD OF THE INVENTION

The present invention relates generally to multi-chip modules (MCMs), and particularly to efficient communication between integrated circuits of MCMs.

BACKGROUND OF THE INVENTION

Communication between Integrated Circuits (ICs) in an MCM is typically done at high hit rates over a multitude of short point-to-point wires (Ultra-Short-Reach, or USR). In "Parallel Ultra-Short Reach Die-to-Die Links," PhD Thesis, Graduate Department of Electrical and Computer Engineering, University of Toronto, 2017, Behzad Dehlaghi Jadid describes the challenges and the techniques that are typically used in USR communications.

SUMMARY OF THE INVENTION

An embodiment of the present invention that is described herein provides a Multi-Chip-Module (MCM) including an MCM substrate and at least a data producing IC (DPIC) and a data-consuming IC (DCIC), both mounted on the MCM substrate and connected to one another through a high-speed bus having a fixed data rate. The DPIC is configured to send data to the DCIC by alternating between (i) first time periods during which the DPIC sends over the bus both produced data and dummy data that together have the fixed data rate of the bus, and (ii) second time periods during which the DPIC sends over the bus only dummy data at the fixed data rate, wherein a rate of the produced date and durations of the first time periods and the second time periods, are preset.

In some embodiments, the rate of the produced data in the first time periods is responsive to a data consumption rate in the DCIC. In some embodiments, start and end times of the second time periods are preset responsive to time intervals in which the DCIC does not consume data.

In some embodiments, the high-speed bus includes a plurality of lanes, and whenever sending data, the DPIC is configured to either (i) send produced data concurrently on a set of the lanes, or (ii) send dummy data concurrently on a set of the lanes, and the DCIC is configured to correct errors in the received data responsive to detecting, at a given time, produced data on one of the lanes in the set and dummy data on another of the lanes in the set.

There is additionally provided, in accordance with an embodiment of the present invention, a method for data transfer in a Multi-Chip-Module (MCM). The method includes, for a data producing IC (DPIC) and a data-consuming IC (DCIC) that are part of the MCM and are connected to one another through a high-speed bus having a fixed data rate, defining (i) first time periods during which the DPIC sends over the bus both produced data and dummy data that together have the fixed data rate of the bus, and (ii) second time periods during which the DPIC sends over the bus only dummy data at the fixed data rate, wherein a rate of the produced date, and durations of the first time periods and the second time periods, are preset. Data is sent from the DPIC to the DCIC by alternating between the first time periods and the second time periods.

The present invention will be more fully understood from the following detailed description of the embodiments thereof, taken together with the drawings in which:

DETAILED DESCRIPTION OF EMBODIMENTS

Overview

The term multi-chip module (MCM) usually refers to an electronic assembly comprising multiple integrated circuits (ICs) and/or discrete components that are integrated, typically on a common substrate. Communication between the ICs of an MCM is done over short distances and is sometimes referred to as Ultra-Short-Reach (USR) communication. We will sometimes refer to the USR also as high-speed bus.

In high-performance MCMs, such as those used in network elements, communication between the ICs of the MCM may be fast and often carried out by dedicated Serializer/Deserializer (SERDES) circuits that are coupled to PHY units and transfer data at high rates over dedicated USR point-to-point wires. We will refer hereinbelow to the IC that transmits the data as Data Producing IC (DPIC), and to the IC that receives the data over the dedicated USR wires as Data Consuming IC (DCIC).

For simple, relatively low-cost implementation, the rate of the USR communication may be fixed. However, the MCM may use different data-consumption rates in different applications or in different configurations. Consequently, the data-consumption rate may be, at times (or always), lower than the fixed rate of the USR connection, and, hence, rate matching may be needed.

Embodiments of the present invention that are disclosed herein provide apparatuses and methods for the adjustment of data rate over the high-speed bus. In some embodiments, a DPIC comprises a rate-adjustment circuitry (RAC), which adds dummy data to the produced data that the DPIC sends over the high-speed bus, so that the high-speed bus data rate will remain unchanged (dummy data, figuratively referred to as "bubbles" below, is a plurality of redundant data symbols which the DCIC removes from the input data stream).

According to embodiments, the RAC comprises a pulse generator, which is preset to generate pulses at a rate that corresponds to the data-consuming rate of the DCIC. The RAC further stores, in a First-In-First-Out (FIFO) memory, data that the DPIC produces. The RAC is further configured to receive from a downstream unit (such as an encoder) read-symbol signals, at a rate that corresponds to the fixed rate of the dedicated high-speed bus. According to embodiments, responsive to a read-symbol input, the RAC sends Data symbols from the FIFO if the number of unread symbols in the FIFO is larger than a preset threshold; and sends bubbles otherwise.

In some embodiments, the DCIC may periodically enter a Data-Pause period and stop consuming data that the DPIC sends. In an embodiment, the times at which the DCIC enters and exits the Data-Pause period are known when the DCIC and the DPIC are configured; the RAC can then track the Data-Pause periods and send bubbles downstream rather than produced data.

Thus, according to embodiments of the present invention that are provided herein, relatively inexpensive fixed-rate USR communication may be used, wherein an RAC unit in the DPIC sends data and bubbles at combined rate that equals the USR fixed rate. The data rate equals the data consumption rate at the DCIC. When the DCIC is in a Data-Pause period, the RAC sends bubbles only.

System Description

Figure 1:
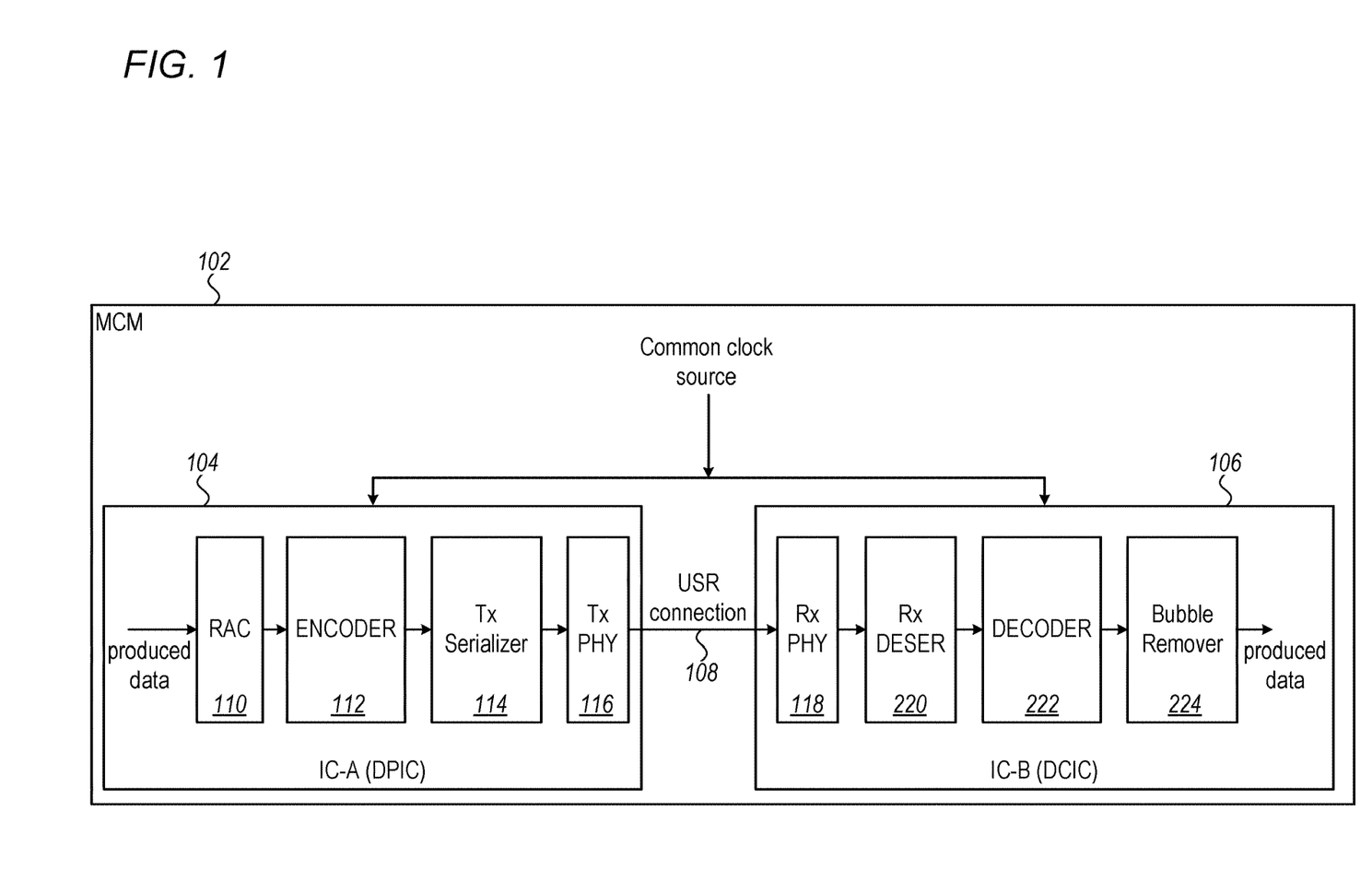
FIG. 1 is a block diagram that schematically illustrates a Multi-Chip-Module (MCM), in accordance with embodiments of the present invention.

FIG. 1 is block diagram that schematically illustrates a Multi-Chip-Module (MCM) 102 in accordance with embodiments of the present invention. The MCM comprises a first Integrated Circuit (IC-A) 104, which sends data to a second integrated Circuit (IC-B) 106, over an Ultra-Short-Range (USR) 108 connection.

In practice, the MCM may comprise other integrated circuits and/or discrete components, which are typically assembled on a common substrate; such elements are not shown in FIG. 1, for clarity. Moreover, both IC-A 104 and IC-B 106 may be coupled to other ICs (or to each other) by additional connections that are not shown, USR or others, and transfer data in any direction. Thus, FIG. 1 illustrates solely a data path within MCM 102, wherein IC-A is a Data-Producing IC (DPIC) and IC-B is a Data-Consuming IC (DCIC). In the description below we will sometimes refer to IC-A and IC-B as DPIC and DCIC, respectively.

The required rate of data transmission over the USR may vary according to the application, which may take place, for example, when the configuration of the MCM changes. In the example embodiment illustrated in FIG. 1, however, the rate is fixed, and equals at least the highest data rate that may be required; hence, the DCIC should adjust the rate when sending data over the USR connection.

DPIC 104 comprises Rate-Adjust Circuitry (RAC) 110 which adjusts the rate of data transmission by adding dummy data (also referred to as "bubbles" typically comprising null symbols) and sends data at the USR fixed transmission rate to an Encoder 112. The encoder encodes data into symbols, and may perform functions such as scrambling, adding error-correction bits, interleaving, 64/66 encoding, and/or any other suitable function. Encoder 112 sends the encoded data to a Tx-Serializer 114, which converts the symbols into high speed serial streams, in one or more lanes, and sends the serial streams to a Tx-PHY 116. The Tx-PHY typically modulates the input bit streams and sends the modulated streams over the physical wires of the USR connection, using, for example, 4-Level Pulse Amplitude Modulation (PAM4) (note that if PAM4 is used, two of the bits of the encoded symbols are not converted to serial by Tx-Serializer 114; rather, the two bits are digital-to-analog converted by the PAM4). Due to the addition of bubbles, the rate over USR connection 108 is fixed.

In DCIC 106, the inverse operations take place—an Rx-PHY 118 demodulates the input from USR 108 and sends bit streams to an Rx-DESER 120, which converts the bit-streams into encoded symbols. A Decoder 122 then decodes the encoded symbols and forwards the decoded symbols to a Bubble-Remover 124, which strips the bubbles from the stream, and forwards the original data that was input to RAC 110 for further processing at the DCIC.

In some embodiments, the DCIC alternates between periods in which the DCIC consumes data ("Data-Consumption Periods") and periods in which the DCIC does not consume data ("Data-Pause periods"). RAC 110 of DPIC 104 is configured to track such periods and send bubbles rather that produced data when the DCIC does not consume data. Accurate tracking is possible because the DPIC and the DCIC share the same clock input and can therefore track the same time events.

Thus, according to the example embodiment illustrated in FIG. 1 and described above, a DPIC can transfer data at various preset rates over a USR that sends data at a fixed rate. MCMs according to the example embodiment will comprise USRs that are optimized to a single transmission frequency and may be less expensive.

As would be appreciated, the structures of MCM 102, DPIC 104 and DCIC 106 described above are cited by way of example. MCMs, DPICs and DCICs in accordance with the disclosed techniques are not limited to the description hereinabove. In alternative embodiments, for example, encoder 112 may precede RAC 110; and/or Bubble Remover 124 may precede Decoder 122. In some embodiments, respective to the modulation technique of Tx-PHY 116, the number of bits that are converted to analog by Tx-PHY 116 rather than Tx-Serializer 114 may be less or more that 2; e.g., 0 for NRZ and 8 for QAM256.

Figure 2:
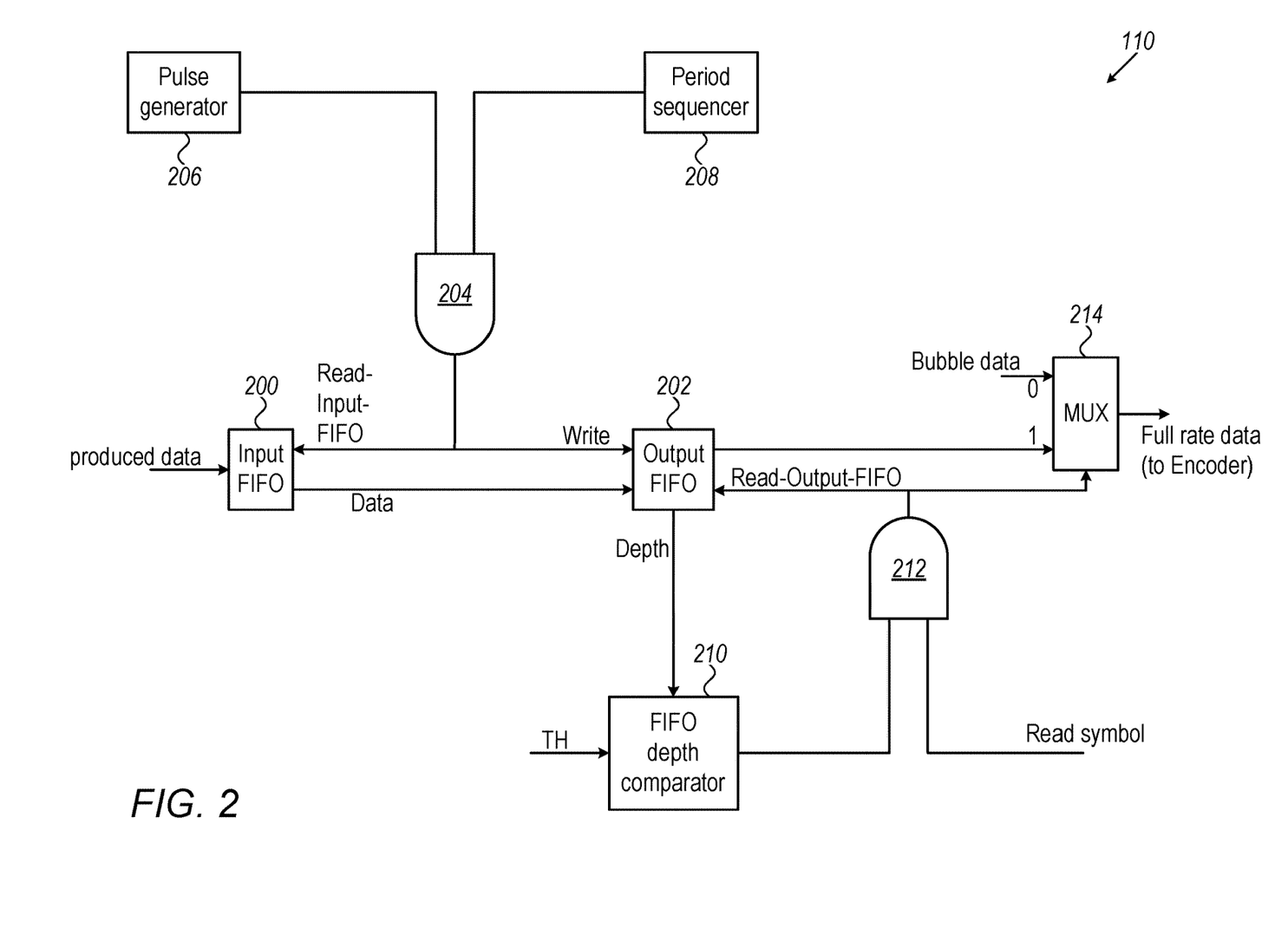
FIG. 2 is a block diagram that schematically illustrates Rate-Adjust Circuitry (RAC), in accordance with embodiments of the present invention.

FIG. 2 is a block diagram that schematically illustrates Rate-Adjust Circuitry (RAC) 110 used in DPIC 104, in accordance with embodiments of the present invention. The RAC receives produced data and sends rate-adjusted data to Encoder 112 (see FIG. 1).

According to the example embodiment illustrated in FIG. 2, the RAC comprises an input First-In-First-Out (FIFO) 200, which is configured to temporarily store data produced by the DPIC. As would be appreciated, such FIFO may exist in upstream units of the DPIC (that are not shown), and thus may not be needed in the RAC. However, for the completeness of the description herein, the input FIFO (or an additional input FIFO) is implemented in the RAC.

An Output FIFO 202 that is coupled to the data output of the input-FIFO, temporarily stores data read from the input-FIFO. The transfer of data from the input-FIFO to the output-FIFO is controlled by an AND gate 204, which send a Read signal to the input-FIFO and a Write signal to the output-FIFO (in practice, the read may precede the write by one or more clock cycles).

A pulse generator 206 is configured to generate pulses at a preset rate which matches the rate of data consumption in the DCIC. In some embodiments, the configuration of the DCIC (and, hence, the data consumption rate) is signaled to the DPIC upon initialization, and, thus, the pulse generator rate may be preset to match the data consumption rate.

According to the example embodiment illustrated in FIG. 2, the DCIC may alternate between a data-pause period of a first preset duration, and a data-consumption period of a second preset period. While in a data-pause period, the DCIC does not consume data (for example, the DCIC may add special symbols to the received data). The DCIC may alternate between a data consumption first period and a data-pause second period (for example, the first period may equal the time it makes to transmit 16383 64/66 bit words, and the second period—the time it takes to transmit a single 64/66 bit word). The durations of the first and second periods may be derived from the configuration of the DCIC and notified to the DPIC upon configuration or reset.

According to the example embodiment, a Period-Sequencer 208 tracks the Data-Pause and Data-Consumption periods of the DCIC. Thus, AND gate 204, which is coupled to both Pulse-Generator 206 and Period-Sequencer 208, will initiate transfer of data from the Input-FIFO to the Output-FIFO at the data consumption frequency, pausing when the DCIC is in the Data-Pause period.

The RAC receives from a downstream unit (e.g. encoder 12, FIG. 1) Read-Symbol pulses at a rate that corresponds to the USR connection rate. Responsive to the Read-Symbol signal, the RAC will output either data or bubbles.

A FIFO-Depth-Comparator 210 compares the depth of the Output-FIFO (e.g., the number of entries that are written but not yet read) to a preset threshold TH. The threshold may be set, for example, responsive to the size of the data units that the encoder processes in a clock cycle. An AND gate 212 outputs a Read-Output-FIFO signal to Output-FIFO 202 if, when a Read-Symbol pulse is input, and the depth of the Output-FIFO is larger than the threshold.

The Read-Output-FIFO signal (or a delayed version thereof) also controls a Multiplexor 214, which forwards downstream (e.g., to the encoder) data from the Output-FIFO or, if the Output-FIFO's depth is not greater than the threshold, bubble data.

Thus, according to the example embodiment illustrated in FIG. 2, the RAC adds bubbles to the produced data, responsively to the data-consumption rate and to the data-pause periods in the DCIC, and thus keeps the USR rate fixed.

As would be appreciated, the structure of RAC 10 described above is cited by way of example. RACs in accordance with the disclosed techniques are not limited to the description hereinabove. For example, in some embodiments, Input-FIFO 200 may be (as described above) implemented in an upstream unit. In an embodiment, Output-FIFO 202, FIFO-Depth-Comparator 210 and AND gate 212 are not implemented; rather, Multiplexor 214, responsive to a Read-Symbol input, transfers data from the input FIFO if the Input-FIFO is not empty and transfers a bubble otherwise. In some embodiments period sequencer 208 and Pulse-Generator 206 are merged into a single timing-control unit.

Figure 3:
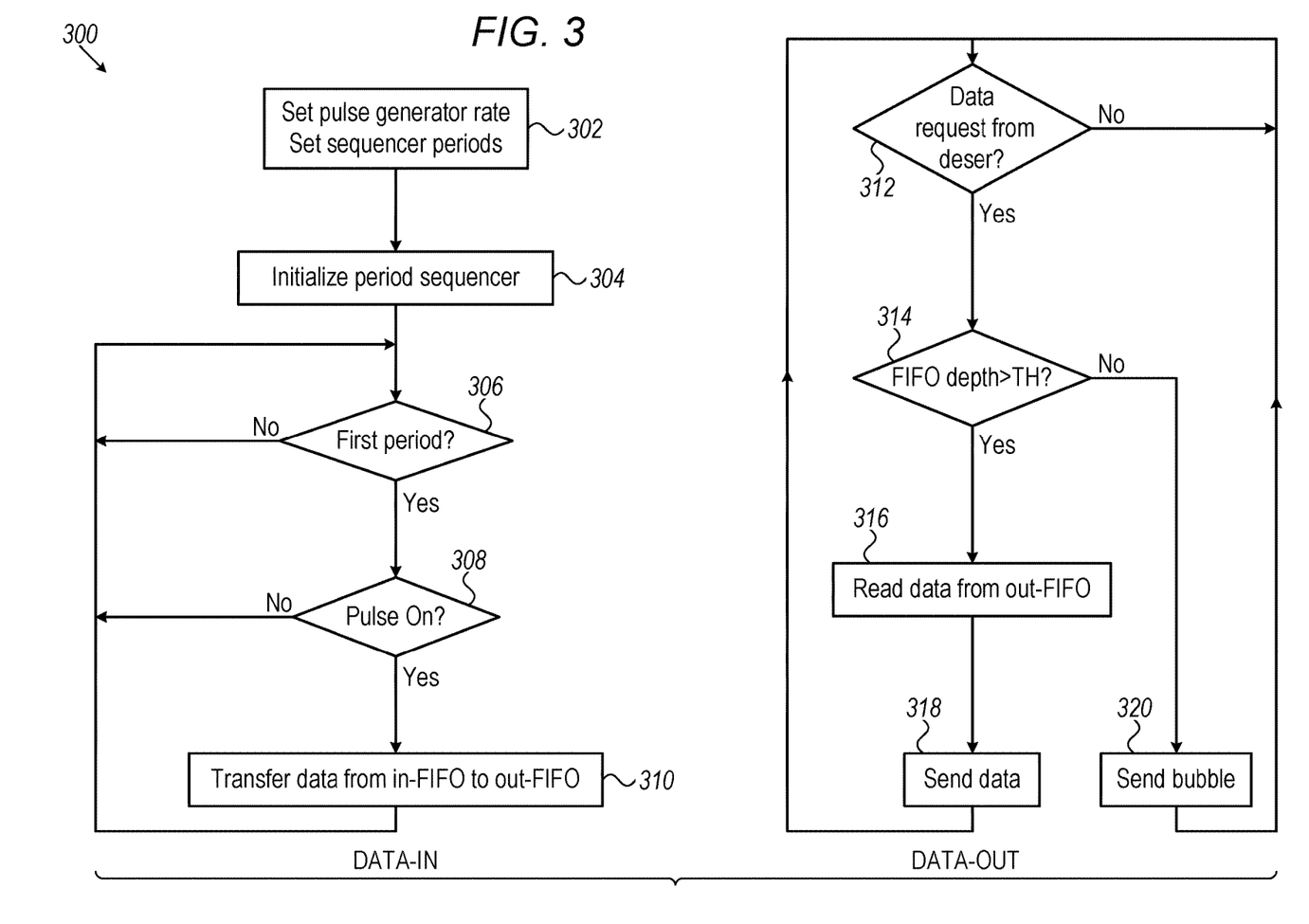
FIG. 3 is a flow chart that schematically illustrates a method for rate adjustment in a Data Producing IC (DPIC), in accordance with an embodiment of the present invention.

FIG. 3 is a flow chart 300 that schematically illustrates a method for rate adjustment in a DPIC, in accordance with an embodiment of the present invention. The flowchart is executed by RAC 110 (FIG. 1).

The flow chart comprises a DATA-IN flow (right part of FIG. 3) and a DATA-OUT flow (left). The RAC executes both flows concurrently.

The Data-In flow starts at a Rate-and-Period-Setting step 302, wherein the RAC sets the rate of pulse generator 206 and the periods of Period-Sequencer 208 (both illustrated in FIG. 2). The RAC sets the rate of the pulse generator to match the data consumption rate in the DCIC and sets the durations of the first and second periods of the Period-Sequencer to match the durations of the Data-Consumption and Data-Pause periods, respectively. The duration of the two periods and the data-consumption rate are preset; e.g., during configuration or during reset.

Next, in an Initializing-Period-Sequencer step 304, the RAC initializes Period-Sequencer 208, so that the periods that the Period-Sequencer generates will be synchronized to the corresponding periods of the DPIC. This can be done, for example, by sending a start signal from the DPIC to the DCIC, or, for another example, if both the DPIC and the DCIC share the same reset signal (other synchronization methods may be used, as would be appreciated by those skilled in the art).

The RAC next enters a First Period-Check step 306 and checks if Periods-Sequencer 208 is in the First Period. If the Periods Sequencer is in the first period the RAC will proceed to a Pulse-On-Check step 308, and check if the pulse that Pulse-Generator 206 (FIG. 2) generates is on.

If, in step 308, the pulse is on, the RAC will enter a Data-Transfer step 310, read the least recent entry of Input-FIFO 200 and write the entry into Output-FIFO 202 (both FIFOs illustrated in FIG. 2); and, then, reenter step 306.

If, in step 306, the period sequencer is in the second period or if, in step 308, the pulse is not on, The RAC will reenter step 306.

To sum-up, in the Data-In flow, the RAC, after setup and initialization, transfers data from the Input-FIFO to the Output-FIFO at a rate corresponding to the DCIC data consumption rate, and stops transferring data when the DCIC is in the data-pause period.

The Data-Out flow starts at a Data-Request-Check step 312, which the RAC continuously executes until the RAC receives a Read-Symbol request from a downstream unit (e.g., from Encoder 112, FIG. 1), whereupon the RAC enters a FIFO-Depth-Check step 314.

In step 314, the RAC checks if the depth of Output-FIFO 202 (FIG. 2) (i.e. the number of FIFO entries that have been written but have not yet been read) is greater that a preset threshold. The threshold may be set, for example, responsive to the size of the data units that the encoder processes in a clock cycle. If the Output-FIFO depth is greater than the threshold, the RAC will enter an Output-FIFO-Read step 316, read the least recent Output-FIFO entry, and then, in a Sending-Date step 318, send the read data downstream (e.g., to Encoder 112). If, in step 314, the depth of Output-FIFO 202 is not greater than the threshold, the RAC will enter a Sending-Bubble step 320 and send a bubble downstream. After both steps 318 and 320 the RAC reenters step 312.

In summary, the RAC, when executing the Data-Out flow, responds to a Read-Symbol request by reading and sending a symbol from the output-FIFO if the Output-FIFO depth exceeds a threshold, and by sending a bubble otherwise.

As would be appreciated, flow 300 described above is cited by way of example. Flows in accordance with the closed techniques are not limited to the description hereinabove. For example, in alternative embodiments, some of the steps may be done at a different order (e.g., steps 306 and 308 may be interchanged), or executed concurrently. Data-In flow and data-Out flow may be merged to a single flow or split to more parallel flows. The flow chart may be executed by hardware, by software or by a combination of hardware and software.

Mitigating USR Communication Noise Effects

USR communication, like any other communication system, is prone to noise, characterized, for example, by a bit-error-rate measure (other measures are sometimes used in addition or instead of bit-error-rate). A variety of error correction techniques may be employed in USR communication, reducing not eliminating) the bit-error rate.

For data symbols (as opposed to control symbols), the damage from a single erroneous symbol that the DCIC receives is relatively small. However, if due to noise, a bubble is interpreted as a data symbol, or if a data symbol is interpreted as a bubble, all the following symbols may be misinterpreted (shifted), and the damage may be substantial.

In some embodiments according to the present invention, USR communication is done over multiple lanes; and the DPIC sends bubbles concurrently on all lanes. The DCIC will then be able to substantially decrease the probability that bubbles will be missed, and that non-bubble symbols will be mistaken for bubbles. For example, if three lanes are used and the DPIC sends bubbles on all three lanes, the DCIC may be configured to consider all three symbols as bubbles even if only two of the received symbols are bubbles, and, if a single bubble is received in one of the three lanes, to convert the bubble to an arbitrary non-bubble (albeit most probably wrong) symbol. Thus, the probability to falsely interpret a bubble as a non-bubble or a non-bubble as a bubble will be significantly reduced.

In an embodiment, the probability that a data symbol will be transformed to a bubble symbol is negligible and, therefore, ignored. The DCIC, whenever a bubble is received in any lane, converts the concurrent symbols on all other lanes to bubbles.

Figure 4:
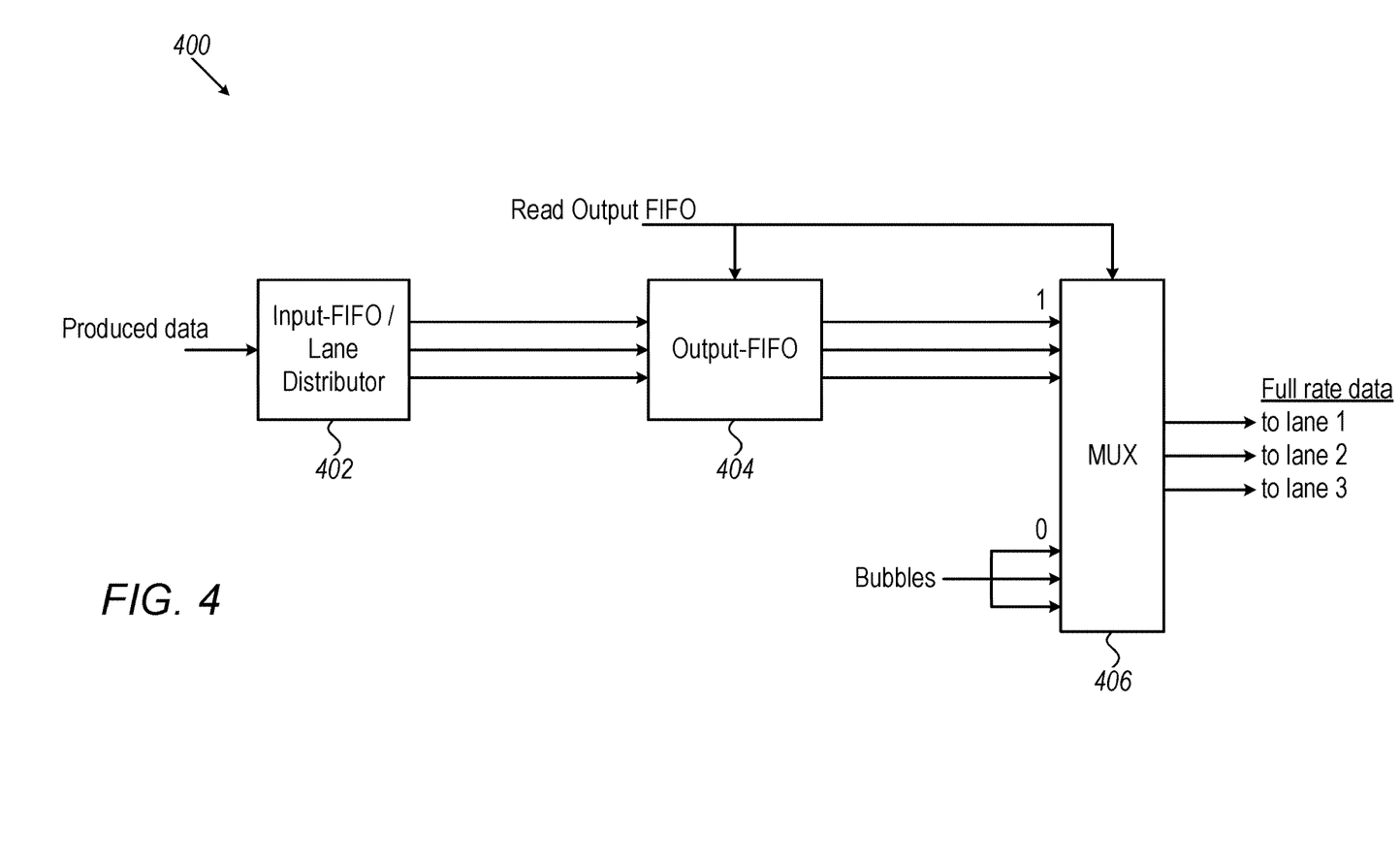
FIG. 4 is a block diagram that schematically illustrates bubble-insertion in multi-lane inter-chip communication, in accordance with embodiments of the present invention.

FIG. 4 is a block diagram. 400 that schematically illustrates bubble-insertion in a multi-lane inter-chip communication, in accordance with embodiments of the present invention. An Input-FIFO-Lane-Distributor 402 distributes to lanes and temporarily stores the produced data (three lanes in the example embodiment illustrated in FIG. 4). The output from Input-FIFO-Lane-Distributor 402 is three parallel symbols, which are written to a 3-symbol-wide Output-FIFO 404.

The control circuits of Input-FIFO-Lane-Distributor 402 an Output-FIFE) 404 are similar, respectively, to the control circuits of Input-FIFO 200 and Output-FIFO 202 (FIG. 2) (as would be evident, the rate of pulse generator 206 is adjusted to account for three lanes).

A Multiplexor 406 either outputs three parallel symbols from the Output-FIFO or three bubbles, responsive to a control that is also used for reading data from the Output-FIFO. Multiplexor 406 is like Multiplexor 214 (FIG. 2), except that Multiplexor 406 outputs three parallel symbols—data or bubbles—for each read-symbol request.

Thus, according to the example embodiment illustrated in FIG. 4, high reliability is achieved while still using bubbles to maintain a fixed. USR transmission rate.

As would be appreciated, block diagram 400 described above is cited by way of example. Multi-lane bubble-insertion circuits in accordance with the disclosed techniques are not limited to the description hereinabove. For example, in alternative embodiments, the number of lanes can be any integer number larger than 1, fixed or programable. In some embodiments, the distribution to lanes is done in later stages such as the encoder, and bubble replication for all lanes is merged with lane distribution.

Figure 5:
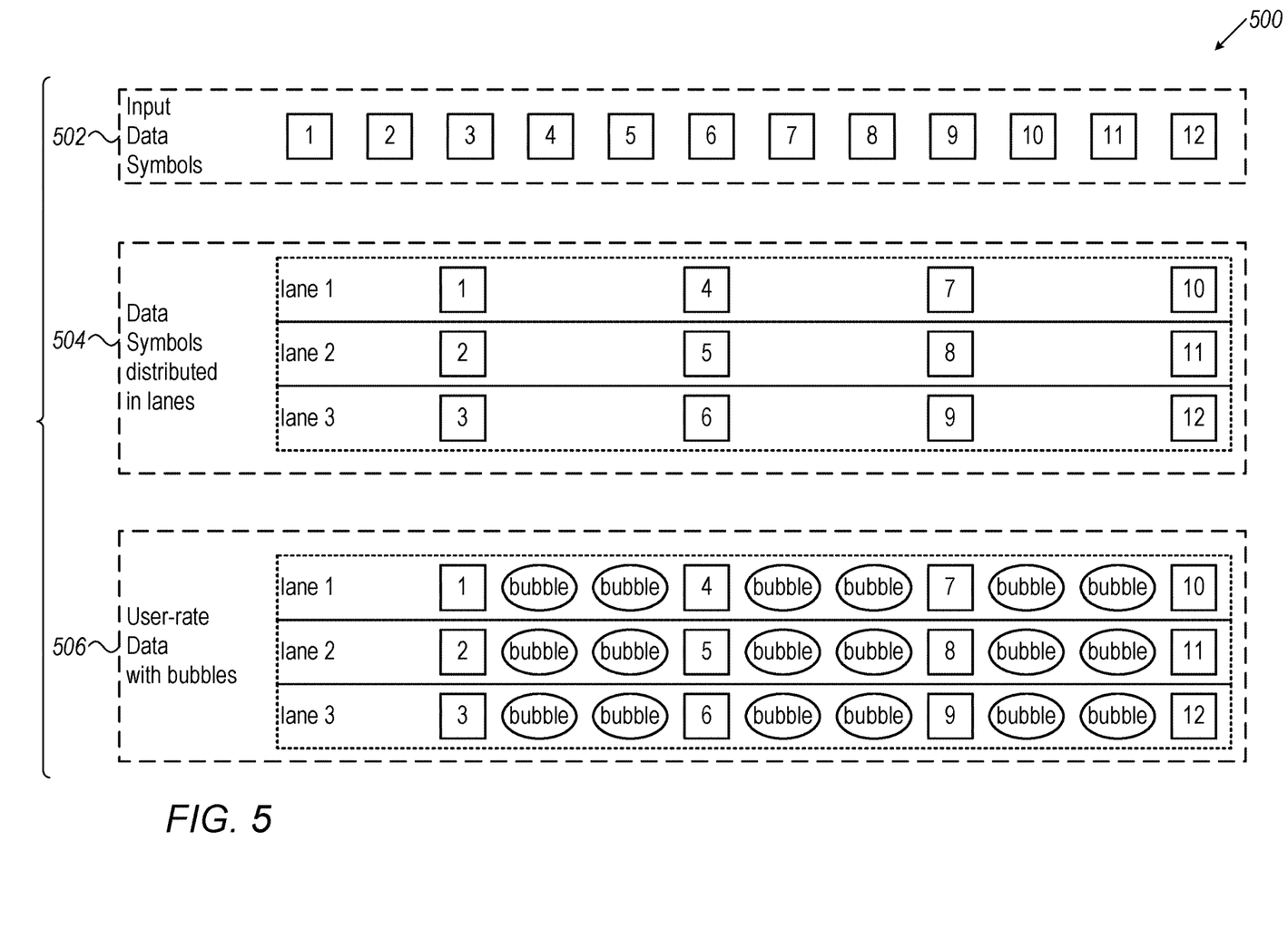
FIG. 5 is a timing diagram that schematically illustrates bubble-insertion in multi-lane inter-chip communication, in accordance with embodiments of the present invention.

FIG. 5 is a timing diagram 500 that schematically illustrates bubble-insertion in a multi-lane inter-chip communication, in accordance with embodiments of the present invention. An Input-Data-Symbols waveform 502 illustrates sequential produced-data symbols that RAC 10 receives, sequentially numbered from 1 to 12. A Data-Symbols-in-Lanes waveform 504 illustrates the data symbols distributed to three lanes—the RAC forwards symbols 1,4 and 10 to a first lane; symbols 2,5,8 and 11 to a second lane; and, symbols 3,6,9 and 12 to a third lane.

As described above (with reference to FIG. 4), bubbles are inserted in ail three lanes concurrently. A USR-Rate-Data-with-Symbols waveform 506 illustrates the data that the RAC outputs at USR communication rate. As can be observed, the PAD adds bubbles in triplets, on all three lanes.

The configuration of MCM 102, RAC 110 and all subunits thereof, as well as method 300 and waveform 500, are example configurations, methods and waveforms that are shown pure y for the sake of conceptual clarity. Any other suitable configurations, methods and waveforms can be used in alternative embodiments.

In various embodiments, DPIC 4 RAC 10 and DCIC 6 may be implemented using suitable hardware, such as one or more Application-Specific Integrated Circuits (ASIC) or Field-Programmable Gate Arrays (FPaA), or a combination of ASIC and FPGA.

Although the embodiments described herein mainly address rate adjustment in MCMs, the methods and systems described herein can also be used in various other systems and applications.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A Multi-Chip-Module (MCM), comprising:
    an MCM substrate; and
    at least a data producing IC (DPIC) and a data-consuming IC (DCIC), both mounted on the MCM substrate and connected to one another through a high-speed bus having a fixed data rate,
    wherein the DPIC is configured to send data to the DCIC over the high-speed bus having the fixed data rate, by alternating between (i) first time periods during which the DPIC sends over the bus both produced data and dummy data that together have the fixed data rate of the bus, and (ii) second time periods during which the DPIC sends over the bus only dummy data at the fixed data rate,
    wherein a rate of the produced data and durations of the first time periods and the second time periods, are preset, and
    wherein the DPIC comprises an input First-In-First-Out (FIFO) memory in which it stores the produced data to be transmitted to the DCIC and is configured in the first time periods to send data symbols when a number of unread symbols in the FIFO memory is larger than a preset threshold and to send dummy data otherwise.

2. The MCM according to claim 1, wherein the rate of the produced data in the first time periods is responsive to a data consumption rate in the DCIC.

3. The MCM according to claim 1, wherein start and end times of the second time periods are preset responsive to time intervals in which the DCIC does not consume data.

4. A Multi-Chip-Module (MCM), comprising:
    an MCM substrate; and
    at least a data producing IC (DPIC) and a data-consuming IC (DCIC), both mounted on the MCM substrate and connected to one another through a high-speed bus having a fixed data rate,
    wherein the DPIC is configured to send data to the DCIC by alternating between (i) first time periods during which the DPIC sends over the bus both produced data and dummy data that together have the fixed data rate of the bus, and (ii) second time periods during which the DPIC sends over the bus only dummy data at the fixed data rate, wherein a rate of the produced data and durations of the first time periods and the second time periods, are preset, and wherein the high-speed bus comprises a plurality of lanes, wherein, whenever sending data, the DPIC is configured to either (i) send produced data concurrently on a set of the lanes, or (ii) send dummy data concurrently on the set of the lanes, and wherein the DCIC is configured to correct errors in the received data responsive to detecting, at a given time, produced data on one of the lanes in the set and dummy data on another of the lanes in the set.

5. A method for data transfer in a Multi-Chip-Module (MCM), the method comprising:

for a data producing IC (DPIC) and a data-consuming IC (DCIC) that are part of the MCM and are connected to one another through a high-speed bus having a fixed data rate, defining (i) first time periods during which the DPIC sends over the bus both produced data and dummy data that together have the fixed data rate of the bus, and (ii) second time periods during which the DPIC sends over the bus only dummy data at the fixed data rate, wherein a rate of the produced data, and durations of the first time periods and the second time periods, are preset; and sending data from the DPIC to the DCIC over the high-speed bus having the fixed data rate by alternating between the first time periods and the second time periods, wherein the DPIC comprises an input First-In-First-Out (FIFO) memory in which it stores the produced data to be transmitted to the DCIC and wherein sending data from the DPIC to the DCIC comprises sending data symbols in the first time periods when a number of unread symbols in the FIFO memory is larger than a preset threshold and sending dummy data otherwise.

6. The method according to claim 5, wherein defining the first and second time periods comprises setting the rate of the produced data in the first time periods responsively to a data consumption rate in the DCIC.

7. The method according to claim 5, wherein defining the first and second time periods comprises presetting start and end times of the second time periods responsively to time intervals in which the DCIC does not consume data.

8. The method according to claim 5, wherein the high-speed bus comprises a plurality of lanes, wherein sending the data comprises sending from the DPIC either (i) produced data concurrently on a set of the lanes, or (ii) dummy data concurrently on the set of the lanes, and comprising, in the DCIC, correcting errors in the received data responsive to detecting, at a given time, produced data on one of the lanes in the set and dummy data on another of the lanes in the set.

9. The MCM according to claim 4, wherein the rate of the produced data in the first time periods is responsive to a data consumption rate in the DCIC.

10. The MCM according to claim 4, wherein start and end times of the second time periods are preset responsive to time intervals in which the DCIC does not consume data.

11. The MCM according to claim 1, wherein the rate of the produced data is always lower than the fixed data rate of the high-speed bus.

12. The MCM according to claim 1, wherein the second time periods are times at which the DCIC stops consuming data from the DPIC and the first time periods are times at which the DCIC consumes data from the DPIC.

* * * * *